US011680507B2

(12) United States Patent
Cvelbar et al.

(10) Patent No.: US 11,680,507 B2

(45) Date of Patent: Jun. 20, 2023

(54) INLET FLOW FOR HIGH EFFICIENCY MIXERS

(71) Applicant: Faurecia Emissions Control Technologies, USA, LLC, Columbus, IN (US)

(72) Inventors: Randall Cvelbar, Columbus, IN (US); Eduardo Alano, Columbus, IN (US); Amee Bhatt, Columbus, IN (US); Amaresh Rakkasagi, Bengaluru (IN); Anthony Burnett, Freetown, IN (US)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 228 days.

(21) Appl. No.: 17/101,226

(22) Filed: Nov. 23, 2020

(65) Prior Publication Data

US 2022/0162974 A1 May 26, 2022

(51) Int. Cl.
*F01N 3/28* (2006.01)
*F01N 3/20* (2006.01)

(52) U.S. Cl.
CPC ......... *F01N 3/2892* (2013.01); *F01N 3/2053* (2013.01); *F01N 3/2066* (2013.01); *F01N 2240/20* (2013.01); *F01N 2410/00* (2013.01)

(58) Field of Classification Search
CPC .... F01N 3/2892; F01N 3/2053; F01N 3/2066; F01N 2240/20; F01N 2410/00; F01N 13/008; F01N 2560/026; F01N 2560/06; B01F 25/3131; B01F 25/4231; B01F 23/2132; B01D 53/9431; Y02A 50/20
USPC ............................................ 60/324; 422/119
See application file for complete search history.

(56) References Cited

U.S. PATENT DOCUMENTS 9,248,404 B2 2/2016 Brunel et al.
9,341,100 B2 * 5/2016 Petry ....................... F01N 3/208
9,714,598 B2 7/2017 Alano et al.
9,995,193 B2 6/2018 Alano et al.
10,287,948 B1 * 5/2019 Moulieres ........... B01F 25/4521
11,085,346 B2 * 8/2021 Tucker .................. F01N 3/2066
2016/0319724 A1 * 11/2016 Alano ................... F01N 3/2066
2017/0082007 A1 * 3/2017 Alano ................... F01N 3/2066
(Continued)

FOREIGN PATENT DOCUMENTS

CN 106523092 A * 3/2017 ........... F01N 3/2066
KR 102114905 B1 5/2020
KR 102114909 B1 5/2020

OTHER PUBLICATIONS

U.S. Appl. No. 16/834,182, filed Mar. 30, 2020.

*Primary Examiner* — Devon C Kramer
*Assistant Examiner* — Kelsey L Stanek
(74) *Attorney, Agent, or Firm* — Carlson, Gaskey & Olds, P.C.

(57) ABSTRACT

A mixer assembly for a vehicle exhaust system includes a mixer shell defining an internal cavity and an inlet reactor positioned within the internal cavity. The inlet reactor has a fluid inlet, a first exhaust gas inlet, and a second exhaust gas inlet. An inlet baffle is mounted to an upstream end of the mixer shell. The inlet baffle includes a first opening that directs exhaust gas into the first exhaust gas inlet, a scoop that directs exhaust gas into the second exhaust gas inlet, and a plurality of bypass openings that direct exhaust gas to bypass entry into the inlet reactor.

24 Claims, 2 Drawing Sheets

(56) References Cited

U.S. PATENT DOCUMENTS

| | | | | |
|---|---|---|---|---|
| 2019/0178140 | A1* | 6/2019 | Alano .................. | F01N 3/2892 |
| 2020/0269189 | A1* | 8/2020 | Alano .................. | F01N 3/2066 |
| 2021/0095587 | A1* | 4/2021 | Cvelbar ................ | F01N 3/2066 |

* cited by examiner

INLET FLOW FOR HIGH EFFICIENCY MIXERS

BACKGROUND

An exhaust system includes catalyst components to reduce emissions. The exhaust system includes an injection system that injects a diesel exhaust fluid (DEF), or a reducing agent such as a solution of urea and water for example, upstream of a selective catalytic reduction (SCR) catalyst which is used to reduce NOx emissions. The injection system includes a doser that sprays the fluid into an exhaust gas stream. A mixer is positioned upstream of the SCR catalyst to mix engine exhaust gases with the injected fluid. It is challenging to configure the plurality of exhaust system components within available packaging space. Compact mixer configurations allow for more efficient packaging but need to maintain high mixing performance while limiting back pressure generation.

SUMMARY

A mixer assembly according to an exemplary aspect of the present disclosure includes, among other things, a mixer shell defining an internal cavity and an inlet reactor positioned within the internal cavity. The inlet reactor has a fluid inlet, a first exhaust gas inlet, and a second exhaust gas inlet. An inlet baffle is mounted to an upstream end of the mixer shell. The inlet baffle includes a first opening that directs exhaust gas into the first exhaust gas inlet, a scoop that directs exhaust gas into the second exhaust gas inlet, and a plurality of bypass openings that direct exhaust gas to bypass entry into the inlet reactor.

In a further non-limiting embodiment of the foregoing assembly, the inlet baffle has a baffle center and is divided into a plurality of sections circumferentially spaced about the baffle center, and wherein the first opening is in a first section of the plurality of sections, the scoop is in a second section of the plurality of sections that is separate from the first section, and the plurality of bypass openings is in a third section of the plurality of sections that is separate from the first and second sections.

In a further non-limiting embodiment of any of the foregoing assemblies, the third section is on an opposite side of the baffle center from the first and second sections.

In a further non-limiting embodiment of any of the foregoing assemblies, the plurality of sections comprise four quadrants, wherein the first section comprises a first quadrant, the second section comprises a second quadrant, and the third section extends across third and fourth quadrants of the four quadrants.

In a further non-limiting embodiment of any of the foregoing assemblies, the inlet baffle has a planar area that includes the plurality of bypass openings, and wherein the scoop comprises a solid surface that extends at an obtuse angle relative to the planar area.

In a further non-limiting embodiment of any of the foregoing assemblies, the solid surface extends from the planar area towards an inner peripheral surface of the mixer shell that defines the internal cavity, and wherein the solid surface has an edge that defines a portion of the first opening.

In a further non-limiting embodiment of any of the foregoing assemblies, the edge is downstream of the planar area.

In a further non-limiting embodiment of any of the foregoing assemblies, the mixer shell includes a doser opening and wherein the fluid inlet of the inlet reactor is aligned with the doser opening and defines an injection axis, and wherein the first and second exhaust gas inlets are on opposite sides of the injection axis from each other.

In a further non-limiting embodiment of any of the foregoing assemblies, the inlet reactor includes a swirl chamber that is comprised of at least a first flow element, a second flow element, and a third flow element that are fixed together to form an internal mixing cavity for injected fluid and exhaust gas, and wherein the first flow element comprises a reactor scoop that defines the first exhaust gas inlet between an inner surface of the reactor scoop and an outer surface of the second flow element that is radially inward of the inner surface relative to the injection axis.

In a further non-limiting embodiment of any of the foregoing assemblies, the second exhaust gas inlet is defined between the outer surface of the second flow element and an inner surface of the third flow element that is radially outward of the outer surface relative to the injection axis.

In a further non-limiting embodiment of any of the foregoing assemblies, the inlet reactor extends along the injection axis from a first end at the fluid inlet to a second end that defines a reactor outlet, and including an end cap at the reactor outlet, the end cap comprising a solid base surface with a peripheral wall surrounding the solid base surface, and wherein the peripheral wall includes a plurality of exit openings through which a mixture of fluid and exhaust gas exits the inlet reactor to mix with bypass flow.

In a further non-limiting embodiment of any of the foregoing assemblies, the inlet reactor has a larger cross-section at the reactor outlet than at the reactor inlet to form a conical shape.

In a further non-limiting embodiment of any of the foregoing assemblies, the inlet reactor includes a doser mount portion that includes a doser mount opening that is aligned with the doser opening in the mixer shell and which defines the fluid inlet.

A vehicle exhaust system, according to yet another exemplary aspect of the present disclosure includes, among other things, a first exhaust component, a second exhaust component downstream of the first exhaust component, and a mixer positioned downstream of the first exhaust component and upstream of the second exhaust component. The mixer comprises a mixer shell defining an internal cavity and an inlet reactor positioned within the internal cavity. The inlet reactor has a fluid inlet, a first exhaust gas inlet, and a second exhaust gas inlet. An inlet baffle is mounted to an upstream end of the mixer shell. The inlet baffle includes a first opening that directs exhaust gas into the first exhaust gas inlet, a scoop that directs exhaust gas into the second exhaust gas inlet, and a plurality of bypass openings that direct exhaust gas to bypass entry into the inlet reactor. A doser mount opening is located on an outer surface of the mixer shell, the doser mount opening configured to receive a doser to inject fluid into the fluid inlet.

In a further non-limiting embodiment of the foregoing system, the inlet baffle has a baffle center and is divided into quadrants circumferentially spaced about the baffle center, and wherein the first opening is in a first quadrant, the scoop is in a second quadrant, and the plurality of bypass openings extend across third and fourth quadrants.

In a further non-limiting embodiment of any of the foregoing systems, an entirety of the first quadrant comprises an open area.

In a further non-limiting embodiment of any of the foregoing systems, the inlet baffle has a planar area that includes the plurality of bypass openings, and wherein the scoop comprises a solid surface that extends at an obtuse angle relative to the planar area.

In a further non-limiting embodiment of any of the foregoing systems, the solid surface extends from the planar area towards an inner peripheral surface of the mixer shell that defines the internal cavity, and wherein the solid surface has an edge that defines a portion of the first opening, and wherein the edge extends downstream of the planar area.

In a further non-limiting embodiment of any of the foregoing systems, the fluid inlet of the inlet reactor is aligned with the doser mount opening and defines an injection axis, and wherein the first and second exhaust gas inlets are on opposite sides of the injection axis from each other, and wherein the inlet reactor extends along the injection axis from a first end at the fluid inlet to a second end that defines a reactor outlet, and including an end cap at the reactor outlet, the end cap comprising a solid base surface with a peripheral wall surrounding the solid base surface, and wherein the peripheral wall includes a plurality of exit openings through which a mixture of fluid and exhaust gas exits the inlet reactor to mix with bypass flow In a further non-limiting embodiment of any of the foregoing systems, the inlet reactor includes a swirl chamber that is comprised of at least a first flow element, a second flow element, and a third flow element that are fixed together to form an internal mixing cavity for injected fluid and exhaust gas, and wherein the first flow element comprises a reactor scoop that defines the first exhaust gas inlet between an inner surface of the reactor scoop and an outer surface of the second flow element that is radially inward of the inner surface relative to the injection axis, and wherein the second exhaust gas inlet is defined between the outer surface of the second flow element and an inner surface of the third flow element that is radially outward of the outer surface relative to the injection axis.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

This disclosure details an exemplary mixer that maximizes the inlet flow area for directing the flow into a reactor of the mixer to minimize backpressure generation.

Figure 1:
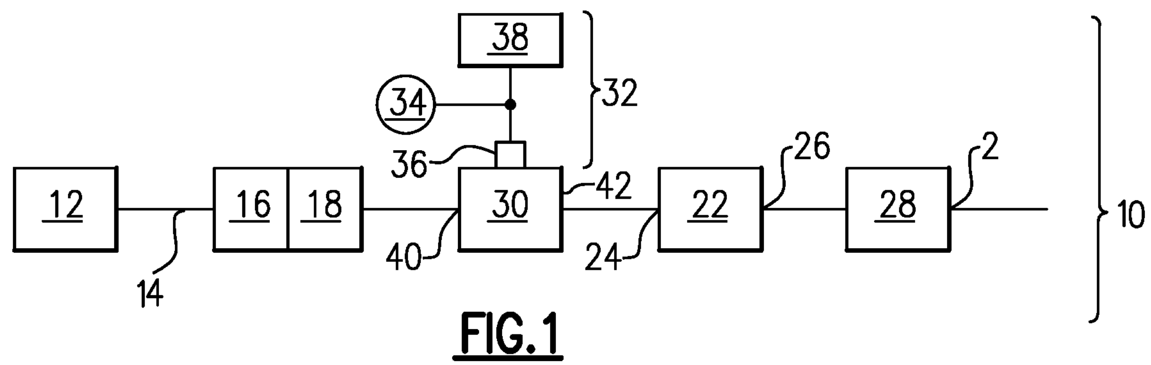
FIG. 1 schematically illustrates one example of an exhaust system according to the subject disclosure.
Figure 3:
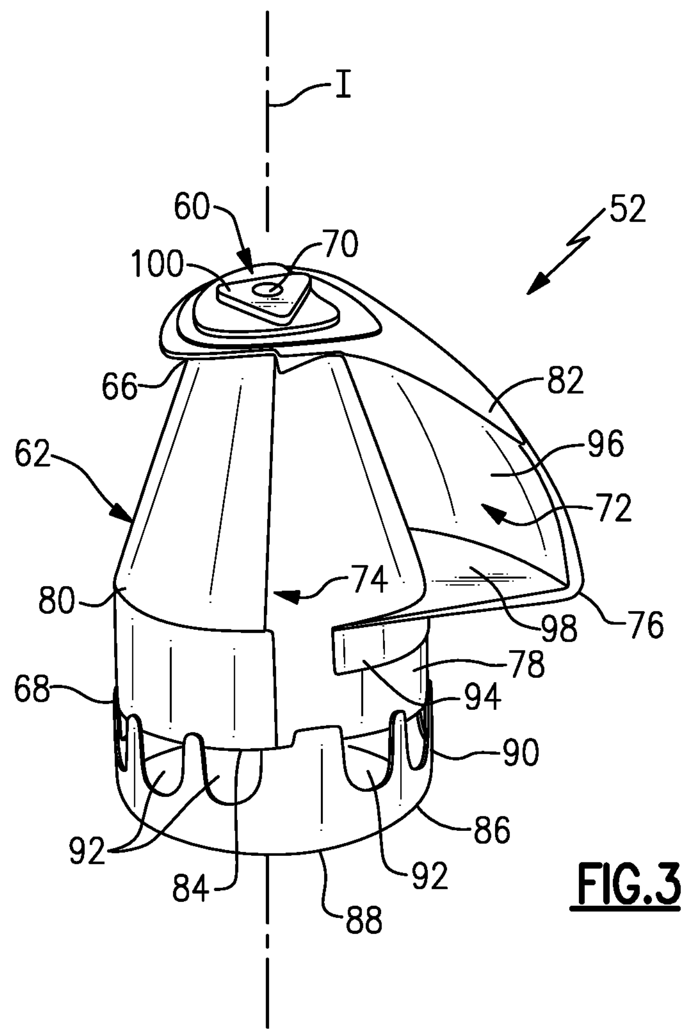
FIG. 3 is a perspective view of an inlet reactor as used in the mixer of FIG. 2.
Figure 5:
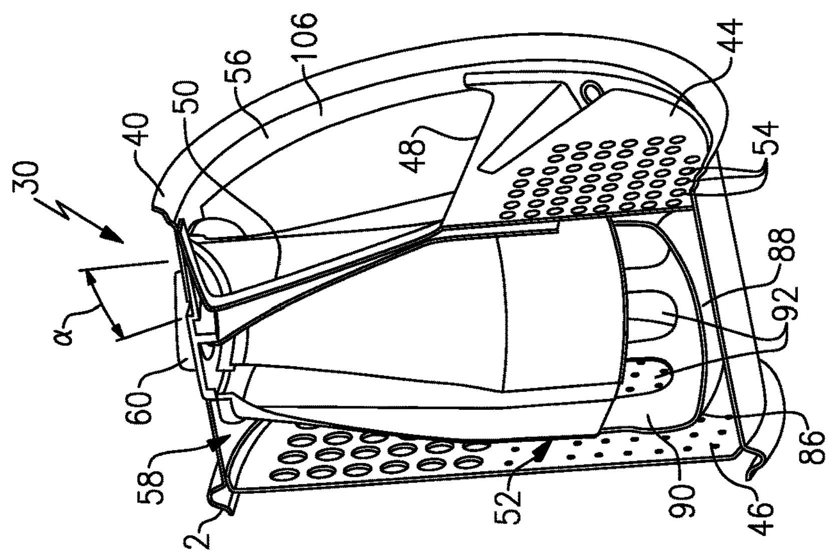
FIG. 5 is a section view of the mixer of FIG. 2.
Figure 4:
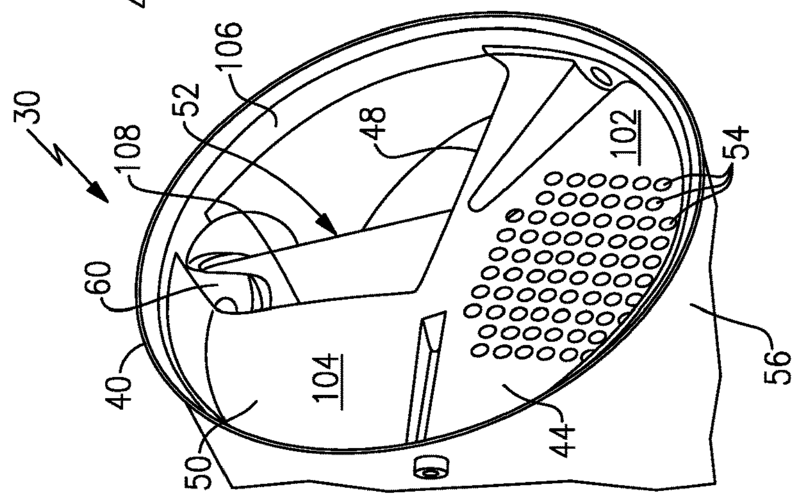
FIG. 4 is a perspective view of an end of the mixer of FIG. 2.
Figure 2:
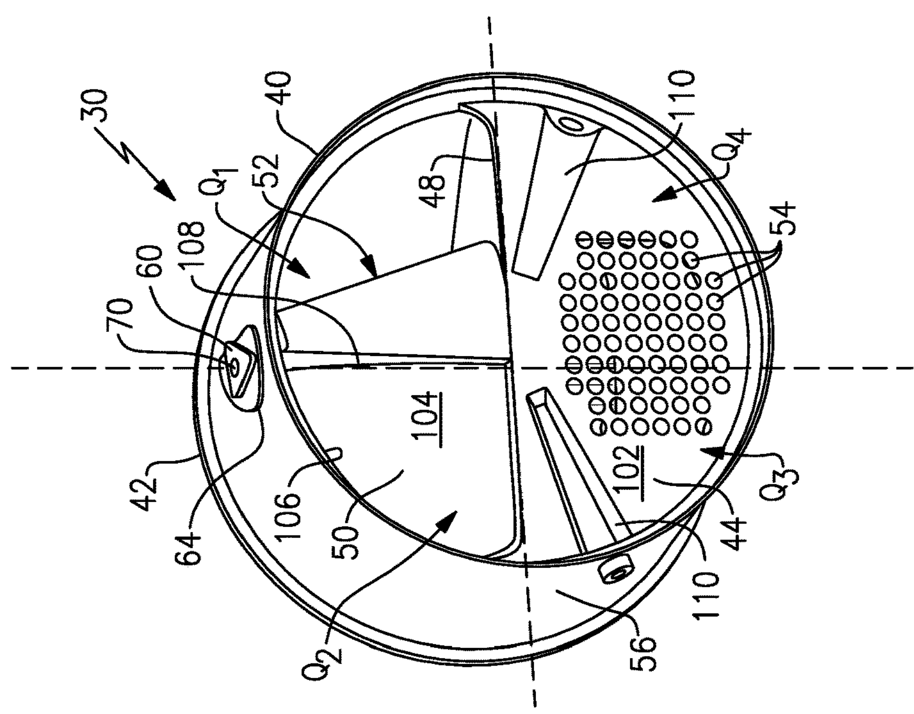
FIG. 2 is an end view of a mixer as used in the exhaust system of FIG. 1.

FIG. 1 shows a vehicle exhaust system 10 that conducts hot exhaust gases generated by an engine 12 through various exhaust components to reduce emission and control noise as known. In one example configuration, at least one pipe 14 directs engine exhaust gases exiting an exhaust manifold of the engine 12 into one or more exhaust gas aftertreatment components. In one example, the exhaust gas aftertreatment components include a diesel oxidation catalyst (DOC) 16, and an optional diesel particulate filter (DPF) 18 that is used to remove contaminants from the exhaust gas as known.

Downstream of the DOC 16 and optional DPF 18 is a selective catalytic reduction (SCR) catalyst 22 having an inlet 24 and an outlet 26. Optionally, component 22 can comprise a catalyst that is configured to perform a selective catalytic reduction function and a particulate filter function. The outlet 26 from the SCR 22 communicates exhaust gases to downstream exhaust components 28 and the exhaust gas eventually exits to atmosphere via a tailpipe 20. The various downstream exhaust components 28 can include one or more of the following: pipes, filters, valves, catalysts, mufflers etc. These exhaust system components can be mounted in various different configurations and combinations dependent upon vehicle application and available packaging space.

In one example, a mixer 30 is positioned downstream from an outlet of the DOC 16 or DPF 18 and upstream of the inlet 24 of the SCR 22. The DOC/DPF and SCR can be in-line or in parallel, for example. The mixer 30 is used to facilitate mixing of the exhaust gas.

An injection system 32 is used to inject a reducing agent, such as diesel exhaust fluid (DEF), for example, into the exhaust gas stream upstream from the SCR catalyst 22 such that the mixer 30 can mix the DEF and exhaust gas thoroughly together. The injection system 32 includes a fluid supply tank 34, a doser 36, and a controller 38 that controls injection of the fluid as known. In one example, the doser 36 injects the DEF into the mixer 30 as shown in FIG. 1. In other examples, the doser 36 can inject the DEF into the exhaust system at other locations such as upstream of the mixer 30.

A control system includes the controller 38 that controls injection of the DEF based on one or more of exhaust gas temperature, backpressure, time, etc. The controller 38 can be a dedicated electronic control unit or can be an electronic control unit associated with a vehicle system control unit or sub-system control unit. The controller 38 can include a processor, memory, and one or more input and/or output (I/O) device interface(s) that are communicatively coupled via a local interface. The controller 38 may be a hardware device for executing software, particularly software stored in memory.

The mixer 30 is used to generate a swirling or rotary motion of the exhaust gas. FIGS. 2-5 show the mixer 30 in greater detail. The mixer 30 has an inlet end 40 configured to receive the engine exhaust gases and an outlet end 42 to direct a mixture of swirling engine exhaust gas and products transformed from the injected fluid to the SCR catalyst 22. The mixer 30 includes an inlet baffle 44 (FIG. 2) at the inlet end 40. An outlet baffle 46 (FIG. 5) is associated with the outlet end 42. In one example, the inlet baffle 44 includes a large inlet opening 48 and a scoop 50 that receive the majority of the exhaust gas and directs the exhaust gas into an inlet reactor 52. The inlet baffle 44 also includes a plurality of perforations, slots, or additional inlet openings 54 that allow the remaining exhaust gas to bypass the inlet reactor 52 to facilitate optimal homogenization of exhaust gases and reduced back pressure.

The inlet 44 and outlet 46 baffles are fixed to a mixer shell 56 that defines a mixer center axis A and provides an internal cavity 58 (FIG. 5) between the inlet 44 and outlet 46 baffles. In one example, the baffles comprises stamped sheet metal parts. The inlet reactor 52 is located within the internal cavity 58. Exhaust gas and injected fluid spray, which is injected via the doser 36 into the inlet reactor 52, are mixed within the inlet reactor 52 and exit into the internal cavity 58 to mix with the bypass exhaust gas before exiting the mixer 30.

In one example, the inlet reactor 52 is used to facilitate mounting the doser 36 relative to the mixer shell 56. The inlet reactor 52 includes a doser mount portion 60 and a swirl chamber 62 that extends into the internal cavity 58. The doser mount portion 60 is mounted to the mixer shell 56 at a doser opening 64 formed within the mixer shell 56. The doser mount portion 60 is configured to support the doser 36 that injects a fluid into the internal cavity 58 of the mixer shell 56.

In one example, the swirl chamber 62 has a first end 66 at the doser opening 64 and a second end 68 at an outlet. In one example, the swirl chamber 62 is comprised of a plurality of flow elements that are attached to each other to form an open internal area within the swirl chamber 62. In one example, the inlet reactor 52 has a fluid inlet 70, a first exhaust gas inlet 72, and a second exhaust gas inlet 74. The fluid inlet 70 is aligned with the doser opening 64 and defines an injection axis I that is transverse to the mixer center axis A. In one example, the injection axis I is generally perpendicular to the mixer center axis A. The large inlet opening 48 of the inlet baffle 44 directs exhaust gas into the first exhaust gas inlet 72, the scoop 50 directs exhaust gas into the second exhaust gas inlet 74, and the plurality of bypass openings 54 direct exhaust gas to bypass entry into the inlet reactor 52. In one example, the first 72 and second 74 exhaust gas inlets are on opposite sides of the injection axis I from each other.

In one example, the plurality of flow elements comprise at least first 76, second 78, and third 80 flow elements. In one example, the first flow element 76 comprises a reactor scoop 82 that defines the first exhaust gas inlet 72 between an inner surface of the reactor scoop 82 and an outer surface of the second flow element 78 that is radially inward of the inner surface of the reactor scoop 82 relative to the injection axis I. The second exhaust gas inlet 74 is defined between the outer surface of the second flow element 78 and an inner surface of the third flow element 80 that is radially outward of the outer surface of the second flow element 78 relative to the injection axis I.

In one example, the inlet reactor 52 extends along the injection axis I from the first end 66 at the fluid inlet 70 to the second end 68 that defines a reactor outlet 84. In one example, an end cap 86 is positioned at the reactor outlet 84. The end cap 86 comprises a solid base surface 88 with a peripheral wall 90 surrounding the solid base surface 88 and extending toward the fluid inlet 70. The peripheral wall 90 includes a plurality of exit openings 92 through which a mixture of fluid and exhaust gas exits the inlet reactor 52 to mix with bypass flow from the bypass openings 54.

In one example, the inlet reactor 52 has a smaller cross-section at the first end 66 than at the second end 68 to form a conical shape. In one example, the second 78 and third 80 flow elements have tapering body portions that start at the first end 66 and extend toward the second end 68 which comprises a cylindrical portion (or oval or race track shape) of a generally constant cross-section.

As discussed above, the inlet reactor 52 includes a doser mount portion 60 that includes a doser mount opening forming the fluid inlet 70 and that is aligned with the doser opening 64 in the mixer shell 56. The second 78 and third 80 flow elements are fixed to each other to substantially surround the injection axis I. The first flow element 76 has an arm portion 94 at the downstream end that is fixed to the second flow element 78. The reactor scoop 82 of the first flow element 76 comprises a curved wall portion 96 and a base wall portion 98 that cooperate to form an enlarged scoop opening for the first exhaust gas inlet 72.

In one example, the curved wall portion 96 transitions into the doser mount portion 60. The doser mount portion 60 includes a center boss 100 with the fluid inlet 70 defining the injection axis I.

In one example, the inlet baffle 44 has a baffle center C and is divided into a plurality of sections circumferentially spaced about the baffle center C. In one example, the plurality of sections comprise quadrants Q1-Q4 that are circumferentially spaced about the baffle center C. The large inlet opening 48 is in a first quadrant Q1, the scoop 50 is in a second quadrant Q2, and the plurality of bypass openings 54 extend across third Q3 and fourth Q4 quadrants. In one example, an entirety of the first quadrant Q1 of the inlet baffle 44 comprises an open area to maximize inlet flow.

In one example, the inlet baffle 44 has a planar area 102 that includes the plurality of bypass openings 54 and the scoop 50 comprises a solid surface 104 that extends at an obtuse angle $\alpha$ relative to the planar area 102. The solid surface 104 extends from the planar area 102 towards an inner peripheral surface 106 of the mixer shell 56 that defines the internal cavity 58. The solid surface 104 has an edge 108 that defines a portion of the large inlet opening 48. The edge 108 is downstream of the planar area 102. In one example, the inlet baffle 44 may include additional indentations 110 for other components such as sensors.

The subject disclosure provides an inlet baffle that allows exhaust gas flow into the reactor as well as allowing a portion of the gas flow to bypass the reactor. The reactor guides and directs the flow around the spray. Maximizing the inlet flow area to directly guide the flow into the inlet reactor is accomplished by using one quadrant of the inlet baffle, acting as a scoop, to direct this flow area into one side of the reactor. The flow into the opposite side of the reactor is accomplished by completely removing the inlet baffle in this quadrant and increasing the size of the sheet metal scoop that is part of the reactor. Thus, the subject disclosure achieves high mixing performance in a compact mixer to maximize the inlet flow area for directing the flow into the reactor to minimize backpressure generation.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

The invention claimed is:

1. A mixer assembly for a vehicle exhaust system comprising:

a mixer shell defining an internal cavity that extends along a mixer center axis from an upstream end to a downstream end;

an inlet reactor positioned within the internal cavity, the inlet reactor having a fluid inlet, a first exhaust gas inlet, a second exhaust gas inlet, and a plurality of exit openings;

an inlet baffle mounted to the upstream end of the mixer shell, the inlet baffle including a first opening that directs exhaust gas into the first exhaust gas inlet, a scoop that directs exhaust gas into the second exhaust gas inlet, and a plurality of bypass openings that direct exhaust gas to bypass entry into the inlet reactor, and wherein at least some of the plurality of bypass openings are spaced apart from each other in a radial direction relative to the mixer center axis; and wherein the inlet baffle has a baffle center and is divided into a plurality of sections circumferentially spaced about the baffle center, and wherein the first opening is in a first section of the plurality of sections, the scoop is in a second section of the plurality of sections that is separate from the first section, and the plurality of bypass openings is in a third section of the plurality of sections that is separate from the first and second sections.

2. The mixer assembly according to claim 1, wherein the third section is on an opposite side of the baffle center from the first and second sections.

3. The mixer assembly according to claim 1, wherein the plurality of sections comprise four quadrants, wherein the first section comprises a first quadrant, the second section comprises a second quadrant, and the third section extends across third and fourth quadrants of the four quadrants.

4. The mixer assembly according to claim 1, wherein the inlet baffle has a planar area that includes the plurality of bypass openings, and wherein the scoop comprises a solid surface that extends at an obtuse angle relative to the planar area.

5. The mixer assembly according to claim 4, wherein the solid surface extends from the planar area towards an inner peripheral surface of the mixer shell that defines the internal cavity, and wherein the solid surface has an edge that defines a portion of the first opening.

6. The mixer assembly according to claim 5, wherein the edge is downstream of the planar area.

7. The mixer assembly according to claim 1, wherein the mixer shell includes a doser opening and wherein the fluid inlet of the inlet reactor is aligned with the doser opening and defines an injection axis, and wherein the first and second exhaust gas inlets are on opposite sides of the injection axis from each other.

8. The mixer assembly according to claim 7, wherein the inlet reactor includes a swirl chamber that is comprised of at least a first flow element, a second flow element, and a third flow element that are fixed together to form an internal mixing cavity for injected fluid and exhaust gas, and wherein the first flow element comprises a reactor scoop that defines the first exhaust gas inlet between an inner surface of the reactor scoop and an outer surface of the second flow element that is radially inward of the inner surface relative to the injection axis.

9. The mixer assembly according to claim 8, wherein the second exhaust gas inlet is defined between the outer surface of the second flow element and an inner surface of the third flow element that is radially outward of the outer surface relative to the injection axis.

10. The mixer assembly according to claim 9, wherein the inlet reactor has a larger cross-section at a reactor outlet than at a reactor inlet to form a conical shape.

11. The mixer assembly according to claim 7, wherein the inlet reactor extends along the injection axis from a first end at the fluid inlet to a second end that defines a reactor outlet, and including an end cap at the reactor outlet, the end cap comprising a solid base surface with a peripheral wall surrounding the solid base surface, and wherein the peripheral wall includes the plurality of exit openings through which a mixture of fluid and exhaust gas exits the inlet reactor to mix with bypass flow.

12. The mixer assembly according to claim 7, wherein the inlet reactor includes a doser mount portion that includes a doser mount opening that is aligned with the doser opening in the mixer shell and which defines the fluid inlet.

13. The mixer assembly according to claim 1, wherein the plurality of bypass openings comprise a plurality of discrete openings that are spaced radially inward of an outer peripheral edge of the inlet baffle, and wherein the plurality of discrete openings are spaced apart from each other circumferentially and radially relative to the mixer center axis.

14. The mixer assembly according to claim 1, wherein the first opening is entirely in the first section of the plurality of sections.

15. The mixer assembly according to claim 1, wherein the inlet reactor extends along an injection axis from a first end at the fluid inlet to a second end that defines a reactor outlet, and including an end cap at the reactor outlet, the end cap comprising a solid base surface that is spaced apart from an inner surface of the mixer shell and that has a peripheral wall surrounding the solid base surface, and wherein the peripheral wall includes the plurality of exit openings through which a mixture of fluid and exhaust gas exits the inlet reactor to mix with bypass flow, and wherein at least some of the plurality of bypass openings overlap the plurality of exit openings.

16. A vehicle exhaust system comprising:

a first exhaust component;

a second exhaust component downstream of the first exhaust component;

a mixer positioned downstream of the first exhaust component and upstream of the second exhaust component, the mixer comprising a mixer shell defining an internal cavity that extends along a mixer center axis from an upstream end to a downstream end, an inlet reactor positioned within the internal cavity, the inlet reactor having a fluid inlet, a first exhaust gas inlet, a second exhaust gas inlet, and a plurality of exit openings, and an inlet baffle mounted to the upstream end of the mixer shell, the inlet baffle including a first opening that directs exhaust gas into the first exhaust gas inlet, a scoop that directs exhaust gas into the second exhaust gas inlet, and a plurality of bypass openings that direct exhaust gas to bypass entry into the inlet reactor, and wherein at least some of the plurality of bypass openings are spaced apart from each other in a radial direction relative to the mixer center axis;

wherein the inlet baffle has a baffle center and is divided into quadrants circumferentially spaced about the baffle center, and wherein the first opening is in a first quadrant, the scoop is in a second quadrant, and the plurality of bypass openings extend across third and fourth quadrants; and a doser mount opening located on an outer surface of the mixer shell, the doser mount opening configured to receive a doser to inject fluid into the fluid inlet.

17. The vehicle exhaust system according to claim 16, wherein an entirety of the first quadrant comprises an open area.

18. The vehicle exhaust system according to claim 16, wherein the inlet baffle has a planar area that includes the plurality of bypass openings, and wherein the scoop comprises a solid surface that extends at an obtuse angle relative to the planar area.

19. The vehicle exhaust system according to claim 18, wherein the solid surface extends from the planar area towards an inner peripheral surface of the mixer shell that defines the internal cavity, and wherein the solid surface has an edge that defines a portion of the first opening, and wherein the edge extends downstream of the planar area.

20. The vehicle exhaust system according to claim 16, wherein the fluid inlet of the inlet reactor is aligned with the doser mount opening and defines an injection axis, and wherein the first and second exhaust gas inlets are on opposite sides of the injection axis from each other, and wherein the inlet reactor extends along the injection axis from a first end at the fluid inlet to a second end that defines a reactor outlet, and including an end cap at the reactor outlet, the end cap comprising a solid base surface with a peripheral wall surrounding the solid base surface, and wherein the peripheral wall includes the plurality of exit openings through which a mixture of fluid and exhaust gas exits the inlet reactor to mix with bypass flow.

21. The vehicle exhaust system according to claim 16, wherein the inlet reactor includes a swirl chamber that is comprised of at least a first flow element, a second flow element, and a third flow element that are fixed together to form an internal mixing cavity for injected fluid and exhaust gas, and wherein the first flow element comprises a reactor scoop that defines the first exhaust gas inlet between an inner surface of the reactor scoop and an outer surface of the second flow element that is radially inward of the inner surface relative to the injection axis, and wherein the second exhaust gas inlet is defined between the outer surface of the second flow element and an inner surface of the third flow element that is radially outward of the outer surface relative to the injection axis.

22. The vehicle exhaust system according to claim 16, wherein the plurality of bypass openings comprise a plurality of discrete openings that are spaced radially inward of an outer peripheral edge of the inlet baffle, and wherein the plurality of discrete openings are spaced apart from each other circumferentially and radially relative to the mixer center axis.

23. The vehicle exhaust system according to claim 16, wherein the first opening is entirely in the first quadrant.

24. The vehicle exhaust system according to claim 16, wherein the inlet reactor extends along an injection axis from a first end at the fluid inlet to a second end that defines a reactor outlet, and including an end cap at the reactor outlet, the end cap comprising a solid base surface that is spaced apart from an inner surface of the mixer shell and that has a peripheral wall surrounding the solid base surface, and wherein the peripheral wall includes the plurality of exit openings through which a mixture of fluid and exhaust gas exits the inlet reactor to mix with bypass flow, and wherein at least some of the plurality of bypass openings overlap the plurality of exit openings.

* * * * *